May 30, 1967  M. BRAWERMAN  3,322,243
ANTI-KNOCK-BACK VEHICLE BRAKE MECHANISM
Filed Dec. 21, 1964
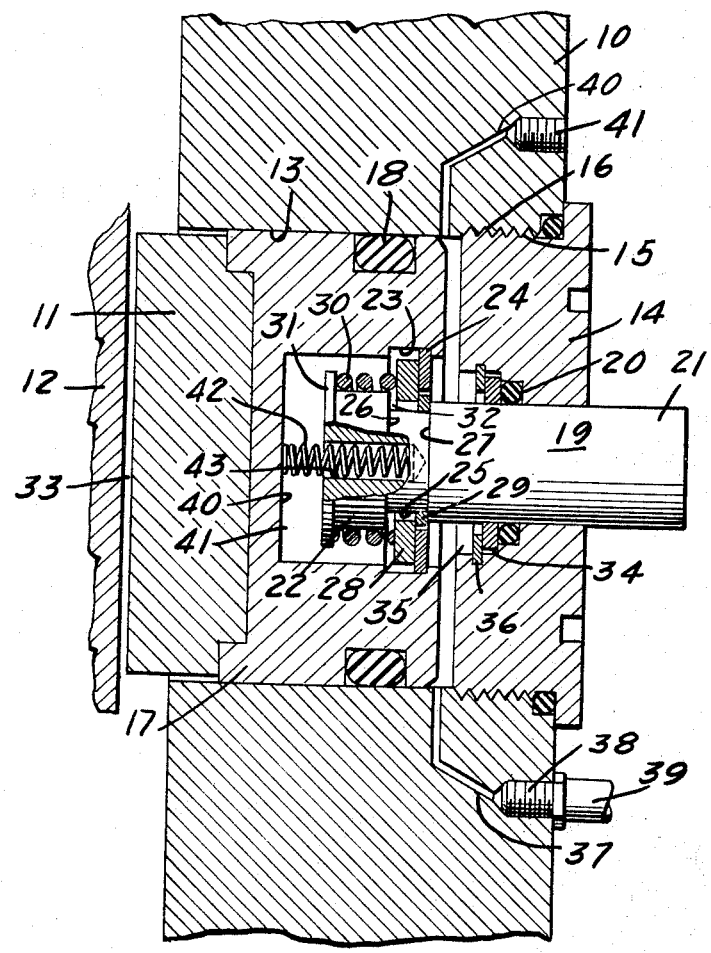
Marvin Brawerman
INVENTOR.
BY Robert M. McManigal
Attorney

United States Patent Office 3,322,243
Patented May 30, 1967

3,322,243
ANTI-KNOCK-BACK VEHICLE BRAKE MECHANISM
Marvin Brawerman, Pacoima, Calif., assignor to Airheart Products, Inc., Van Nuys, Calif., a corporation of California
Filed Dec. 21, 1964, Ser. No. 419,695
3 Claims. (Cl. 188—196)

The present invention relates generally to brakes for vehicles, and is more particularly concerned with a brake actuating mechanism especially for disc type brakes having means for automatically compensating for brake wear and maintaining a predetermined brake clearance which will not be affected by the operating condition peculiar to such brakes and referred to generally as "knock-back."

The present invention constitutes improvements in braking mechanisms of the type disclosed in United States Letters Patent No. 3,113,646, issued Dec. 10, 1963.

Briefly, the above patent discloses fluid pressure actuated power means for actuating the brake elements, the power means comprising a cylinder and associated main piston for moving the brake elements in a braking direction. An auxiliary piston, mounted for reciprocable movement, is normally retained against movement by a friction holding device, except when a predetermined frictional force thereof is exceeded. The main piston and auxiliary piston are interconnected for limited relative axial movements which are confined during normal operation to predetermined limits which constitute the normal brake clearance, when the braking elements are in brake released position. The normal brake clearance is established by the auxiliary piston, each time the brake is operated. Normally, the braking elements are actuated within the predetermined limits of the established clearance space until the brake wear becomes so great that the brake will not set up tightly within the predetermined limits of movement. Under such conditions, the actuating pressure applied to the brake piston causes relative movement beyond the predetermined limits, and as a result a force is exerted which is greater than the friction holding force applied to the auxiliary piston. The auxiliary piston is then moved to a new position so as to automatically compensate for brake wear. Upon release of the brake, the main piston will be withdrawn by means of a compression spring to again establish the operation with normal brake clearance.

Although actuating mechanisms for disc brakes have come into wide general use on vehicles, the constructions heretofore were such that they could be undesirably affected by the application of extraneous forces which might operate to move the piston abnormally from its normal position a sufficient amount to drive the auxiliary piston outwardly away from its normal position, and in this way set up undesirable operating conditions in the brake pedal.

Extraneous forces which are particularly inherent in the usual disc brake arrangements are commonly referred to as "knock-back." Such forces may result from a number of causes, such as:

(a) Disc run-out and flutter;
(b) Wheel, spindle, bearing and disc deflections which occur during cornering of the vehicle; and
(c) Vibrations, blows and other shocks which may occur in various combinations, or with other forces.

"Knock-back" results in excessive and inconsistent pedal travel which is not only annoying to the vehicle operator, but also present an undesirable driving hazard. Numerous attempts have heretofore been made to solve the problem of knock-back, but these have in the main resulted in relatively complicated and expensive mechanisms which have been only partially successful and have failed to provide other than a partial solution to the problem.

Having in mind the foregoing, the present invention has for one object the provision of simple, effective and inexpensive means in fluid pressure actuators for disc brakes which will prevent the undesirable operating effects occasioned by knock-back.

Another object of the invention is to provide a structural arrangement which may be incorporated in combination with means for automatically compensating for brake wear of the character disclosed in the above mentioned patent.

Further objects of the invention will be brought out in the following part of the specification, wherein detailed description is for the purpose of fully disclosing the invention without placing limitations thereon.

Referring to the accompanying drawings, the single figure is a diametral section taken through a brake operating mechanism embodying the features of the present invention, certain of the parts being disclosed in elevation for clearness.

Referring generally to the accompanying drawings, for illustrative purposes the present invention is shown as including a body structure 10 which houses the brake actuating mechanism for moving an associated braking element or shoe 11 into and out of engagement with a companion braking element 12 which for the purposes of the present description may be considered as being a brake disc associated with the vehicle wheel, and against which the braking forces are adapted to be applied.

It will be appreciated that the body structure may assume various configurations, but in general embodies a cylindrical bore 13 which form a fluid cylinder, this bore being open at one end and closed at the opposite end by means of a closure wall structure in the form of a bushing 14 having a threaded inner end 15 adapted to threadedly engage the threads of a wall opening 16 at this end of the cylindrical bore.

A main piston 17 of cup-shaped construction has an outer end arranged to engage with the brake shoe 11. On its peripheral surface, the piston has a recessed O-ring 18 which makes sealing engagement with the inner wall of the cylinder.

An auxiliary piston 19 comprising an adjusting member is mounted within the cylindrical bore 13 in coaxial relation to the main piston. The auxiliary piston is supported for reciprocable movements in the bushing 14, the bushing having a recessed O-ring 20 for sealing engagement with the outer surface of a cylindrical shank portion 21 at this end of the auxiliary piston. The other end of the auxiliary piston is formed with a head portion 22 which is positioned within the cup-shaped inner end of the main piston 17. As thus mounted, the shank portion 21 of the auxiliary piston projects outwardly of the bushing to form a visual indicator by which the position of the auxiliary piston may be observed.

Within the cup-shaped portion of the main piston, there is provided a circumferentially extending groove 23 within which there is mounted a removable inwardly projecting snap ring 24 in surrounding relationship to the inner head portion 22 of the auxiliary piston. Radially inwardly of this groove 23, the auxiliary piston is likewise provided with a circumferentially extending groove 25, this groove opening outwardly towards the groove 23 and being formed on one side with a radially extending abutment shoulder 26 and on its opposite side with an abutment shoulder 27. A ring member 28 is retained in the groove 25 by means of a retaining snap ring 29 which in effect now forms an abutment shoulder in spaced relation to the abutment shoulder 26 and permits limited movement of the ring 28 axially of the groove 25. The extent of this movement constitutes the normal built-in clearance, as will hereinafter be explained more fully. The ring member 28 is made of such diameter as to overlap the inner marginal edge of the snap ring 24, and a compression spring 30 is positioned in surrounding relation to the head portion of the auxiliary piston, one end of this spring bearing against a projecting flange 31, and the other end of the spring bearing against the ring member 28.

As thus arranged, the main piston and auxiliary piston are interconnected for limited axial movement, and that under normal conditions the spring 30 will maintain the ring member 28 against the abutment formed by the retaining snap ring 29 so that a clearance space 32 will now exist between the shoulder 26 forming the other abutment and the adjacent surface of the ring member 28. This space corresponds with the brake clearance 33. The effective area of the auxiliary piston is such that it will be moved outwardly each time the brake is operated to assure that the normal brake clearance is established. With the parts as shown, it will be readily apparent that energization of the main piston for braking action will move it towards a braking position within the extent of the clearance space 33, and the auxiliary piston moved outwardly to close the clearance space 32. However, in the event that the brake shoes may have become worn, or for some other reason the clearance 33 should exceed the normal limits of the clearance space 32, the main piston will be ineffectual to provide the required braking affect between the braking elements within the limits of the clearance space 32. Under such conditions, a new position of the auxiliary piston will be established with respect to its normal support position in the bushing 14. Movement of the auxiliary piston to the new position is accomplished by engagement of the ring member 28 with the shoulder 26, and the extent of movement of the auxiliary piston will correspond to that required to establish proper braking engagement between the braking elements. Upon deenergization of the main piston, the spring 30 will then retract the main piston and again establish the required brake clearance.

A holding device is provided to grippingly engage the auxiliary piston against axial movement, except when it becomes necessary to exceed the limited movement of the main piston as explained above, or when the auxiliary piston is moved to establish the normal brake clearance each time the brake is operated. This holding device comprises a grip ring 34 which surrounds the shank of the auxiliary piston, this ring being seated in a recess 35 in the inner end of the bushing 14 and retained therein by means of a retaining snap ring 36. Various arrangements may be utilized to provide the frictional retaining force against the auxiliary piston. For example, the grip ring may be in the form of a split ring which is compressed into frictional engagement with the auxiliary piston, or it may take the form of a distorted ring which frictionally engages the auxiliary piston, as explained in detail in the previously mentioned patent structure.

From the foregoing description, and as seen in the illustrated embodiment of the single view, the outer projecting end serves as a guide or indicator of the amount of brake shoe wear.

Pressurized fluid for operating the brake is supplied through a passage 37 which communicates with a terminal connector 38 of a supply conduit 39. Proper operation is assured by the provision of a bleed passage 40 through which entrapped air may be removed. The outlet of the bleed passage is normally closed by a removal plug 41.

While it has previously been noted above that the auxiliary piston establishes the required clearance each time the brake is operated, the auxiliary piston is also effective to establish the clearance under an abnormal operating condition in which the brake shoe is already in engagement with the braking element, when the main piston is in brake releasing position. This condition may result from a variety of causes such as the installation of a new braking shoe, or the expansion of the shoe or a braking element due to heating and other factors which may cause a physical change in these parts. Thus, when the fluid pressure is applied within the cylinder, this pressure cannot immediately cause movement of the main piston because the brake shoe is already against the braking element 12. Thus, unless the brake shoe clearance is reestablished, the brake shoe will not be withdrawn from the braking element when the actuating pressure is released. Since the main piston cannot move in a brake setting position, the pressure will act, as previously explained, to move the auxiliary piston outwardly until the ring member 28 is engaged by the shoulder abutment 26. This movement is possible for the reason that the force applied to the auxiliary piston exceeds the frictional holding force of the holding device. Thus, the built-in clearance is automatically reestablished.

Heretofore, it has been the usual practice to provide only a small clearance between the head portion 22 of the auxiliary piston and the adjacent surface 40 which constitutes the bottom of the cupped interior of the main piston. Further, in some arrangements, the engagement of the adjacent head surface with the surface 40 is utilized as a means for limiting movement of the main piston to normal non-braking position in the manner in which the snap ring 29 is utilized in the disclosed structure. Such arrangements have been found to be susceptive to "knock-back" conditions which may operate to apply an extraneous force against the braking element 11 in a direction to cause the main piston to be moved back a sufficient distance to engage the head portion of the auxiliary piston which is thus moved in an outward direction to a new position corresponding to an above-normal clearance for the piston. A greater brake pedal movement is thus necessary in order to effect a proper braking response of the brake mechanism. The provision of a construction which will be unaffected by the "knock-back" forces constitutes a primary objective of the present invention.

Accordingly, it is proposed to provide in the actuator of the present invention a considerably greater clearance, as indicated by the numeral 41, between the surface 40 and the adjacent surface of the head portion 22 of the auxiliary piston. This clearance is chosen so as to be greater than any movement which might be normally experienced by the main piston due to "knock-back" forces. By this simple expedient of increasing the clearance 41, the brake actuator is made "antiknock-back" when used in a reliable residual pressure hydraulic system in which the system pressure is reduced in off braking periods to pressures of the order of 10 to 20 p.s.i., but not to zero. The residual pressure, thus acts to restore the main piston to its normal clearance position, in the event that the piston is deflected in a non-braking direction so as to move the snap ring 24 away from its engaged position with the ring member 28. Thus, by an extremely simple expedient, the problem of "knock-back" is solved in the case of residual pressure hydraulic operating systems.

In order to achieve the same effect in systems in which there is no residual pressure, a light coiled compression spring 42 is seated with one end extending into an open ended axial recess 43 provided in the adjacent head portion of the auxiliary piston. The other end of this spring extends through the space 41 into engagement with the surface 40 at the bottom of the cupped portion of the main piston. In this case, the spring force acts to urge the main piston towards the normal clearance position in the same manner as the residual fluid pressure. Thus in the present invention, it is possible in a very simple manner to provide an "antiknock-back" brake actuator, which effectively solves the problem that has previously proved to be unsurmountable even with the most expensive and complicated arrangements.

Various modifications may suggest themselves to those skilled in the art without departing from the spirit of my invention, and, hence, I do not wish to be restricted to the specific form or forms shown or uses mentioned, except to the extent indicated in the appended claims.

I claim:
1. Braking mechanism, comprising:
   (a) cooperable braking elements mounted for relative movements into braking and non-braking relation;
   (b) a cylinder;
   (c) a main piston reciprocable in said cylinder for relatively moving said braking elements into said braking relation;
   (d) an auxiliary piston having a longitudinal axis coaxial with the main piston axis;
   (e) a friction holding device for releasing said auxiliary piston for axial movement with a predetermined holding force is exceeded;
   (f) a spring acting between said auxiliary piston and said main piston for returning the main piston to a normal brake clearance position with the braking elements in non-braking relation;
   (g) a spring acting between said auxiliary piston and said main piston for returning said main piston to said normal brake clearance position, upon movement of said main piston by an extraneous force to an above-normal clearance position; and
   (h) abutment means operative between said pistons each time an actuating fluid pressure is applied to said pistons to move said auxiliary piston in one direction to overcome the holding device and establish said normal clearance position, and under overnormal brake application movement to overcome the holding device and advance the auxiliary piston in an opposite direction to a new position.

2. Braking mechanism, comprising:
   (a) cooperable braking elements mounted for relative movements into braking and non-braking relation;
   (b) a cylinder;
   (c) a main piston reciprocable in said cylinder for relatively moving said braking elements into said braking relation;
   (d) an adjusting auxiliary piston having a longitudinal axis coaxial with the main piston axis, said pistons having adjacently positioned inner ends;
   (e) a friction holding device for releasing said auxiliary piston for axial movement when an axial force is exerted thereon in excess of a predetermined holding force of said device;
   (f) axially spaced abutments carried by said auxiliary piston;
   (g) a stop member supported for limited movement between said abutments and when engaged with one of said abutments to establish a predetermined normal brake clearance position;
   (h) a spring acting between the inner end of said auxiliary piston and said stop member for normally urging the latter into engagement with said one of said abutments;
   (i) main piston abutment means movable into and out of engagement with said stop member at its normal brake clearance position and being movable therewith as the main piston is moved in a brake applying direction; and
   (j) a spring acting between the inner end of said auxiliary piston and said main piston for urging said main piston abutment means into engagement with said stop member, and to return said abutment means into engagement, upon movement out of engagement by an extraneous force to an above-normal clearance position.

3. Braking mechanism, comprising:
   (a) cooperable braking elements mounted for relative movements into braking and non-braking relation;
   (b) a cylinder;
   (c) a main piston reciprocable in said cylinder for relatively moving said braking elements into said braking relation;
   (d) an adjusting member having a longitudinal axis coaxial with the main piston axis, and being formed with a cylindrical body and a head portion at its inner end;
   (e) a friction holding device having gripping engagement with said cylindrical body, but releasing said adjusting member for axial movement when a predetermined holding force is exceeded;
   (f) axially spaced circumferentially extending shoulder abutments adjacent the inner end of said auxiliary piston;
   (g) an annular stop member surrounding said auxiliary piston and positioned for limited movement between said abutments;
   (h) a spring urging said stop member into engagement with one of said abutments to establish a normal brake clearance position with the braking elements in non-braking relation;
   (i) means carried by said main piston including a circumferentially extending abutment normally engaged with said stop member, but being disengageable upon movement of the main piston by an extraneous force to an above-normal clearance position; and
   (j) a spring urging said main piston in a return direction to normal clearance position, upon removal of said extraneous force.

References Cited
UNITED STATES PATENTS

| | | | |
|---|---|---|---|
| 3,113,646 | 12/1963 | Airheart et al. | 188—196 |
| 3,122,222 | 2/1964 | Burnett et al. | 188—196 |
| 3,200,911 | 8/1965 | Rumelin | 188—196 |

FOREIGN PATENTS

| | | |
|---|---|---|
| 1,342,626 | 9/1963 | France. |

DUANE A. REGER, *Primary Examiner.*